(12) United States Patent
Lin et al.

(10) Patent No.: US 9,758,022 B1
(45) Date of Patent: Sep. 12, 2017

(54) VEHICLE CURTAIN ASSEMBLY

(71) Applicant: MACAUTO INDUSTRIAL CO., LTD., Tainan (TW)

(72) Inventors: Paul Lin, Tainan (TW); Hung-Ming Yen, Tainan (TW)

(73) Assignee: MACAUTO INDUSTRIAL CO., LTD., Tainan (TW)

( * ) Notice: Subject to any disclaimer, the term of this patent is extended or adjusted under 35 U.S.C. 154(b) by 0 days.

(21) Appl. No.: 15/069,844

(22) Filed: Mar. 14, 2016

(51) Int. Cl.
  *B60R 5/04* (2006.01)
  *B60J 1/20* (2006.01)

(52) U.S. Cl.
  CPC ............ *B60J 1/208* (2013.01); *B60J 1/2038* (2013.01); *B60J 1/2044* (2013.01); *B60R 5/047* (2013.01)

(58) Field of Classification Search
  CPC ......... B60R 5/047; B60J 1/208; B60J 1/2038; B60J 1/2044
  USPC ............... 160/370.22, 22, 23.1, DIG. 11; 242/595.1; 248/273; 296/37.16, 97.8, 296/214
  See application file for complete search history.

(56) References Cited

U.S. PATENT DOCUMENTS

| | | | | |
|---|---|---|---|---|
| 559,678 | A * | 5/1896 | Clark | E06B 9/78 160/307 |
| 934,357 | A * | 9/1909 | Rhoads | E06B 9/54 160/100 |
| 1,360,424 | A * | 11/1920 | McGaughy | A47F 7/175 242/595.1 |
| 1,363,321 | A * | 12/1920 | Jaeger | E04F 10/0662 242/595.1 |
| 1,706,261 | A * | 3/1929 | Strongson | E06B 9/58 160/293.1 |
| 1,736,527 | A * | 11/1929 | Garcia | E06B 9/60 160/21 |
| 1,765,451 | A * | 6/1930 | Schane | E04F 10/0677 242/595.1 |
| 1,793,195 | A * | 2/1931 | Roberts | E06B 9/54 160/23.1 |
| 2,098,105 | A * | 11/1937 | Nye | E06B 9/17 160/23.1 |
| 3,021,894 | A * | 2/1962 | La Due | B60J 11/02 160/23.1 |

(Continued)

FOREIGN PATENT DOCUMENTS

| | | |
|---|---|---|
| DE | 10322319 A1 | 12/2004 |
| DE | 102011008143 A1 | 7/2012 |

OTHER PUBLICATIONS

English Abstract for DE 10322319, Total of 1 page.
English Abstract for DE 102011008143, Total of 1 page.

*Primary Examiner* — David Purol
(74) *Attorney, Agent, or Firm* — Lynette Wylie; Apex Juris, pllc.

(57) ABSTRACT

A vehicle curtain assembly has an axle tube, a reeling device, a curtain fabric, a rim board, and an auxiliary wheel mechanism. The axle tube has a side wall and a slot defined in the sidewall. The reeling device is mounted in the axle tube. The curtain fabric extends into the axle tube via the slot and is connected to and reeled around the reeling device. The rim board is connected to the curtain fabric. The auxiliary wheel mechanism is mounted on the side wall of the axle tube and is applied to abut a bottom of the curtain fabric, to rotate to push the curtain fabric to move toward the slot, and to abut a bottom of the rim board to position the rim board.

9 Claims, 14 Drawing Sheets

(56) References Cited

U.S. PATENT DOCUMENTS

| | | | | |
|---|---|---|---|---|
| 4,846,241 A | * | 7/1989 | Chomka | ............... E06B 9/54 |
| | | | | 160/23.1 |
| 5,584,523 A | * | 12/1996 | Kawaguchi | ............ B60R 5/047 |
| | | | | 296/37.16 |
| 2011/0266828 A1 | | 11/2011 | Kikuchi et al. | |
| 2014/0138981 A1 | * | 5/2014 | Lin | ....................... B60J 1/2038 |
| | | | | 296/97.4 |

* cited by examiner

VEHICLE CURTAIN ASSEMBLY

BACKGROUND OF THE INVENTION

1. Field of the Invention

The present invention relates to a vehicle curtain assembly, and more particularly to a vehicle curtain assembly that has an auxiliary wheel mechanism to assist a curtain fabric in reeling completely into an axle tube.

2. Description of Related Art

A vehicle curtain assembly may be mounted in a vehicle to provide shading effect to the objects in the vehicle. A conventional vehicle curtain assembly substantially comprises an axle tube, a reeling device, and a curtain fabric. The reeling device is mounted in the axle tube. The curtain fabric can be expanded from the axle tube and is connected to the reeling device to be automatically reeled into the axle tube by the reeling device. A hard rim board is mounted on an end of the curtain fabric to allow the curtain fabric to be expanded easily and to be positioned in the vehicle after the curtain fabric is expanded. The rim board comprises a rod and two positioning members mounted respectively on two ends of the rod.

When the vehicle curtain assembly is mounted on a rear window of a vehicle to shade the objects in a trunk of the vehicle, two ends of the axle tube are connected to and positioned at two sides of the trunk near the rear seat. The curtain fabric is expanded from the axle tube and the positioning members on the rod are engaged respectively with two sides of the trunk. Accordingly, the curtain fabric is positioned at the expanded status to shade the objects in the trunk.

However, the curtain fabric is softer than the rim board, so the rim board has a weight heavier than that of the curtain fabric. When the positioning members are disengaged from the sides of the trunk, the rim board will naturally droop due to the heavy weight of the rim board. Accordingly, the reeling force provided by the reeling device is insufficient to completely reel the curtain fabric into the axle tube. Consequently, the drooping rim board easily bumps and damages the objects in the trunk due to the shake generated during the movement of the vehicle.

To overcome the shortcomings, the present invention tends to provide a vehicle curtain assembly to mitigate or obviate the aforementioned problems.

SUMMARY OF THE INVENTION

The main objective of the invention is to provide a vehicle curtain assembly that has an auxiliary wheel mechanism to assist a curtain fabric in reeling completely into an axle tube.

The vehicle curtain assembly has an axle tube, a reeling device, two tube positioning members, a curtain fabric, a rim board, and an auxiliary wheel mechanism. The axle tube has two ends, a side wall, and a slot defined in the sidewall. The reeling device is mounted in the axle tube. The two tube positioning members are mounted respectively on the two ends of the axle tube. The curtain fabric extends into the axle tube via the slot and is connected to and reeled around the reeling device. The rim board is connected to an end of the curtain fabric that extends out of the slot of the axle tube and has a rim rod having two ends and two fabric positioning elements mounted respectively on the two ends of the rim rod. The auxiliary wheel mechanism is mounted on the side wall of the axle tube and has at least one wheel assembly. Each one of the at least one wheel assembly has a wheel base and at least one wheel. The wheel base is mounted on the side wall of the axle tube. The at least one wheel is rotatably mounted on the wheel base and is applied to abut a bottom of the curtain fabric, to rotate to push the curtain fabric to move toward the slot, and to abut a bottom of the rim board to position the rim board.

Other objects, advantages and novel features of the invention will become more apparent from the following detailed description when taken in conjunction with the accompanying drawings.

DETAILED DESCRIPTION OF PREFERRED EMBODIMENT

Figure 1:
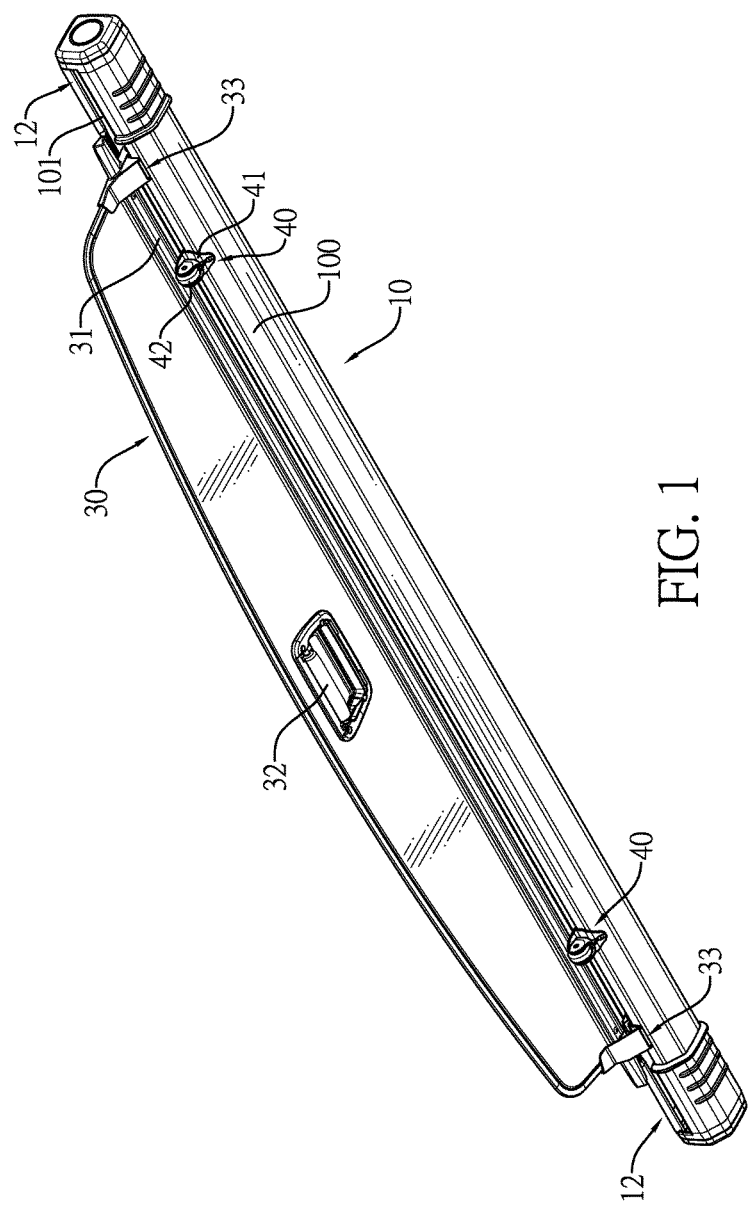
FIG. 1 is a perspective view of a first embodiment of a vehicle curtain assembly in accordance with the present invention.
Figure 5:
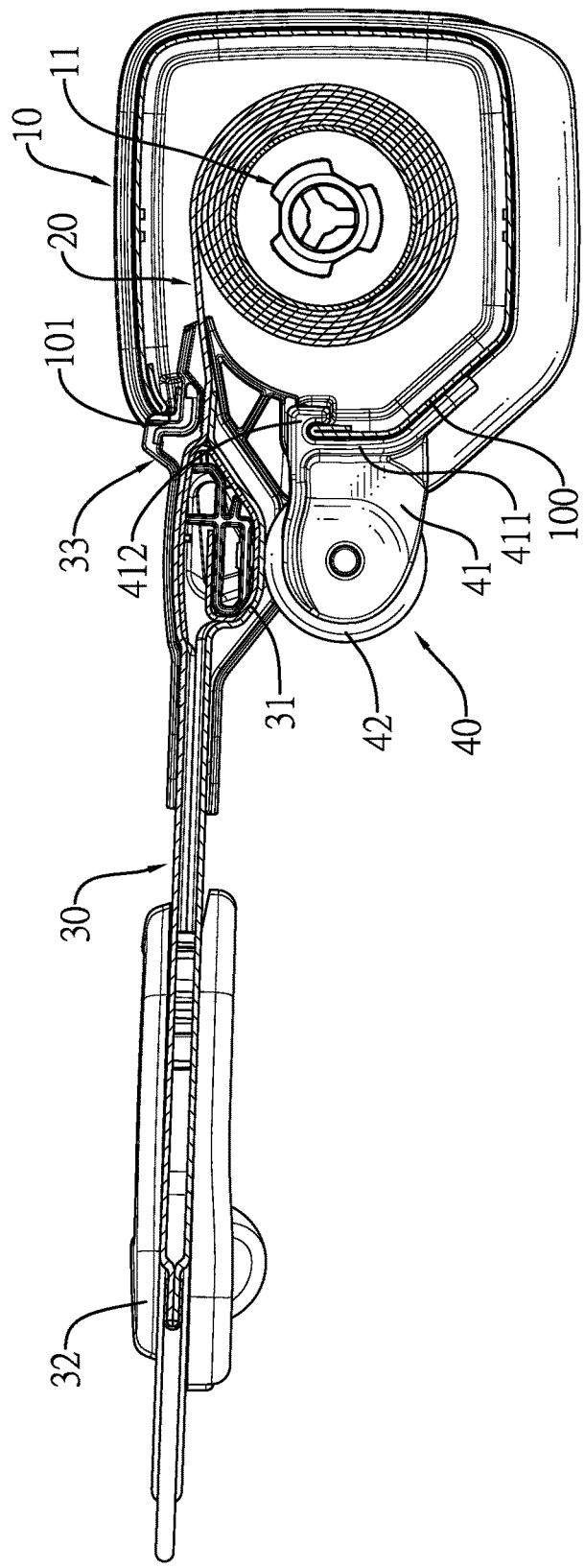
FIG. 5 is an end view in partial section of the vehicle curtain assembly along the line 5-5 in FIG. 4.

With reference to FIGS. 1 and 5, a vehicle curtain assembly in accordance with the present invention comprises an axle tube 10, a reeling device 11, two tube positioning members 12, a curtain fabric 20, a rim board 30, and an auxiliary wheel mechanism.

Figure 2:
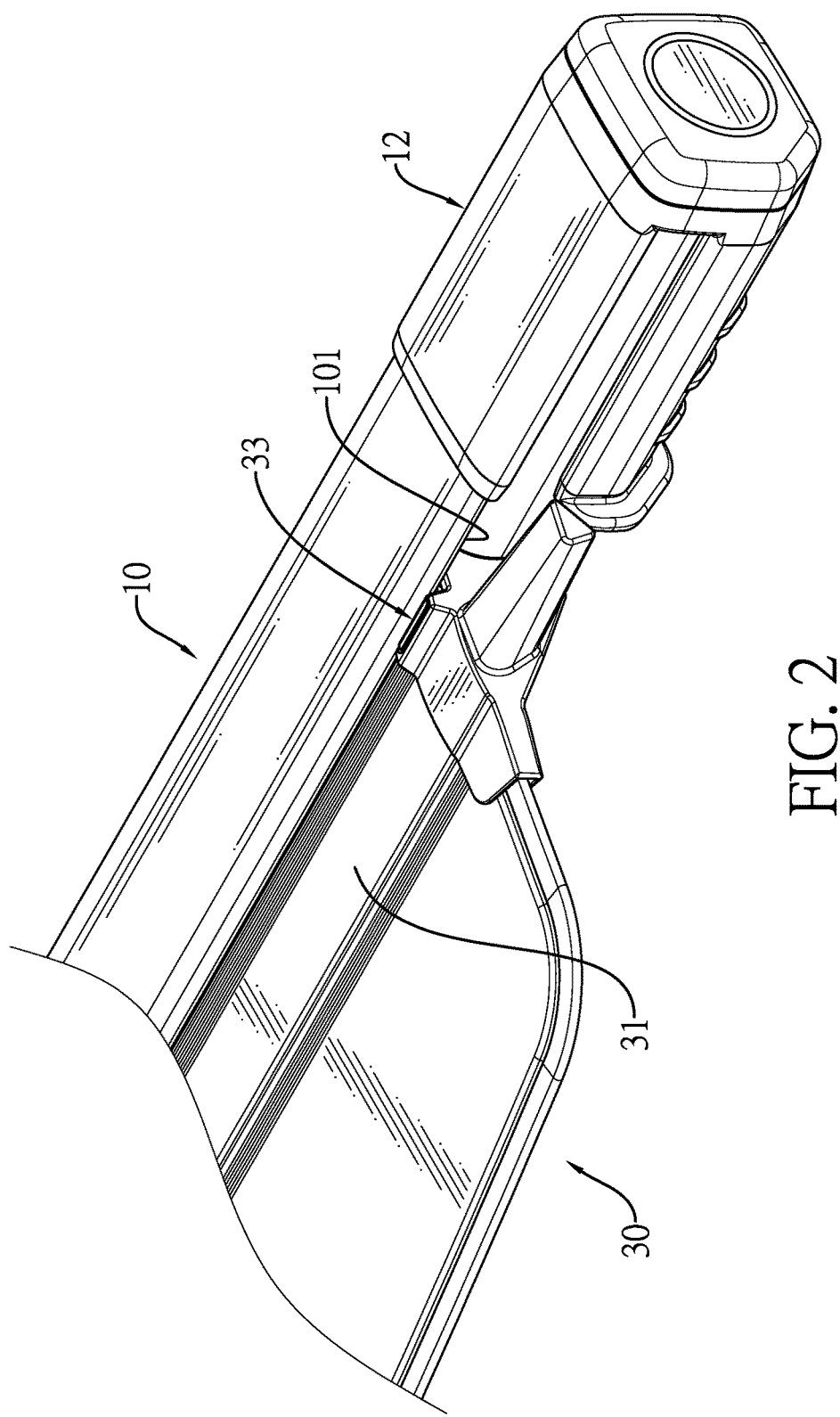
FIG. 2 is an enlarged partial perspective view of the vehicle curtain assembly in FIG. 1.

With reference to FIGS. 1, 2, and 5, the axle tube 10 is hollow and has two ends, a side wall 100, and a slot 101 defined in the sidewall 100. The reeling device 11 is mounted in the axle tube 10.

With reference to FIGS. 1 to 4, the two tube positioning members 12 are mounted respectively on the two ends of the axle tube 10 and are retractable relative to the axle tube 10 along an axial direction of the axle tube 10.

With reference to FIG. 5, the curtain fabric 20 extends into the axle tube 10 via the slot 101 and is connected to and reeled around the reeling device 11. The rim board 30 is connected to an end of the curtain fabric 20 that extends out of the slot 101 of the axle tube 10 and comprises a rim rod 31 and a pulled portion 32. The rim rod 31 has two ends and two fabric positioning elements 33 mounted respectively on the two ends of the rim rod 31. The pulled portion 32 is formed on the rim board 30 to allow the user to pull the rim board 30 with the pulled portion 32.

Figure 3:
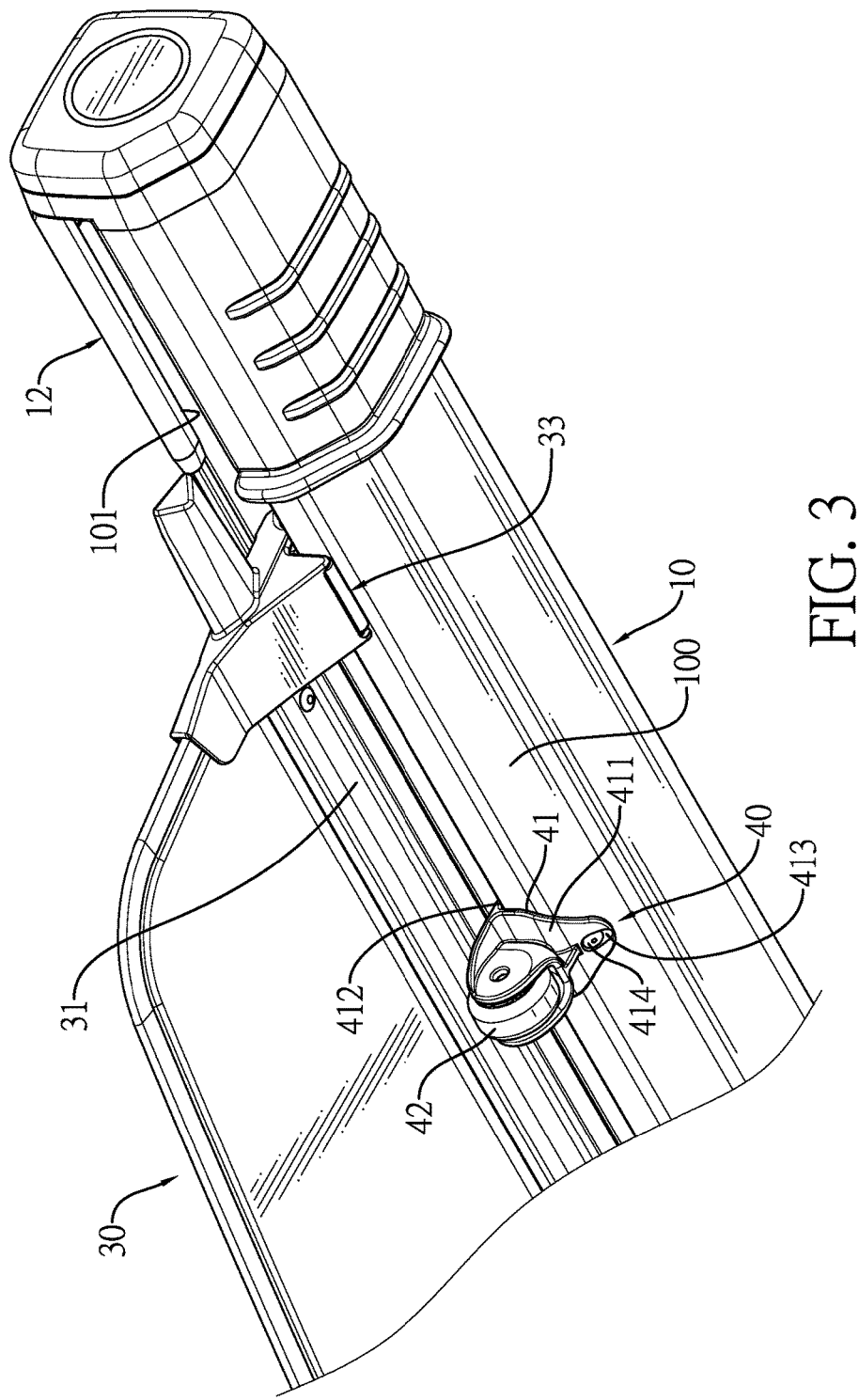
FIG. 3 is another enlarged partial perspective view of the vehicle curtain assembly in FIG. 1.
Figure 4:
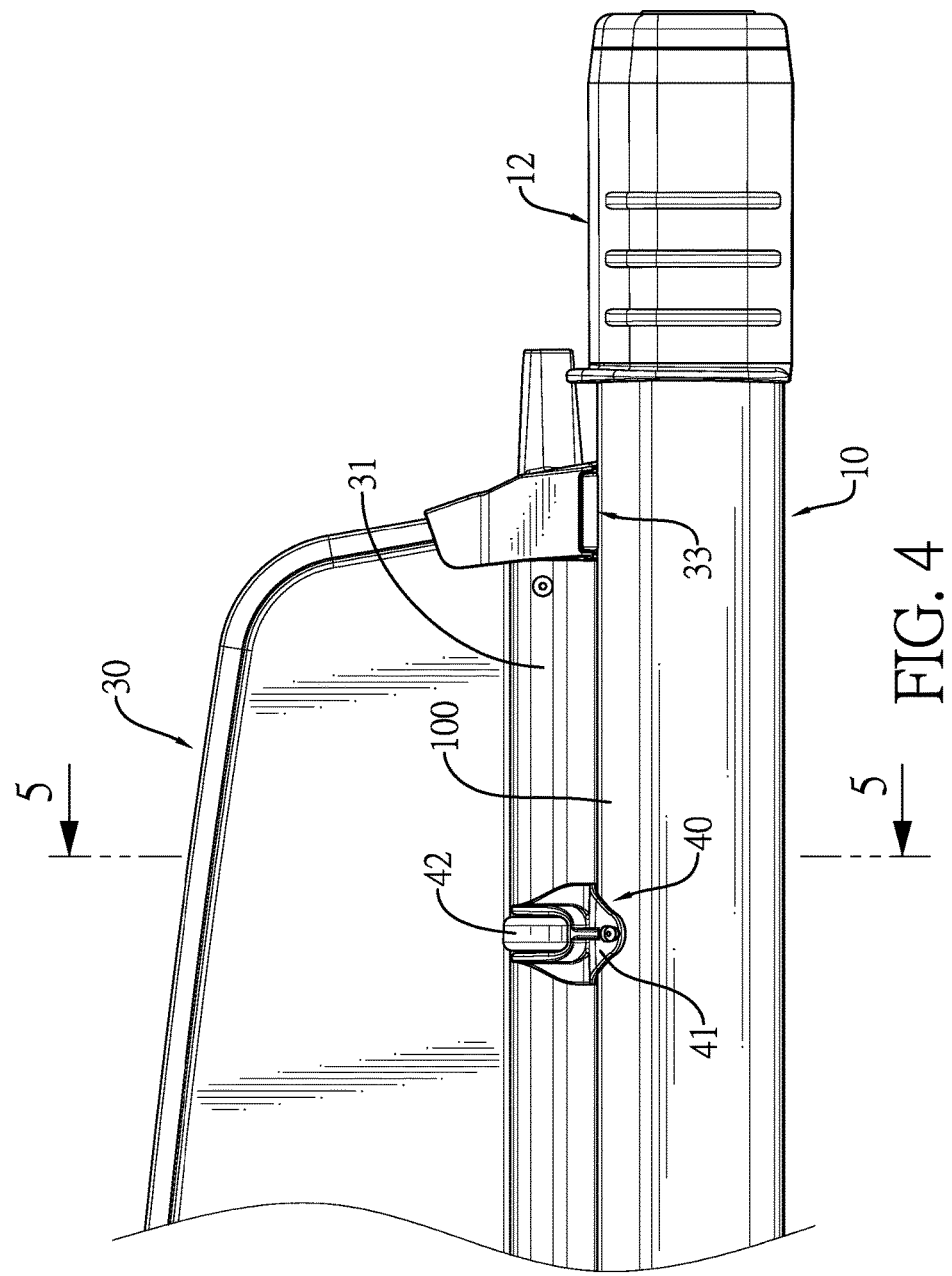
FIG. 4 is an enlarged partial side view of the vehicle curtain assembly in FIG. 1.
Figure 13:
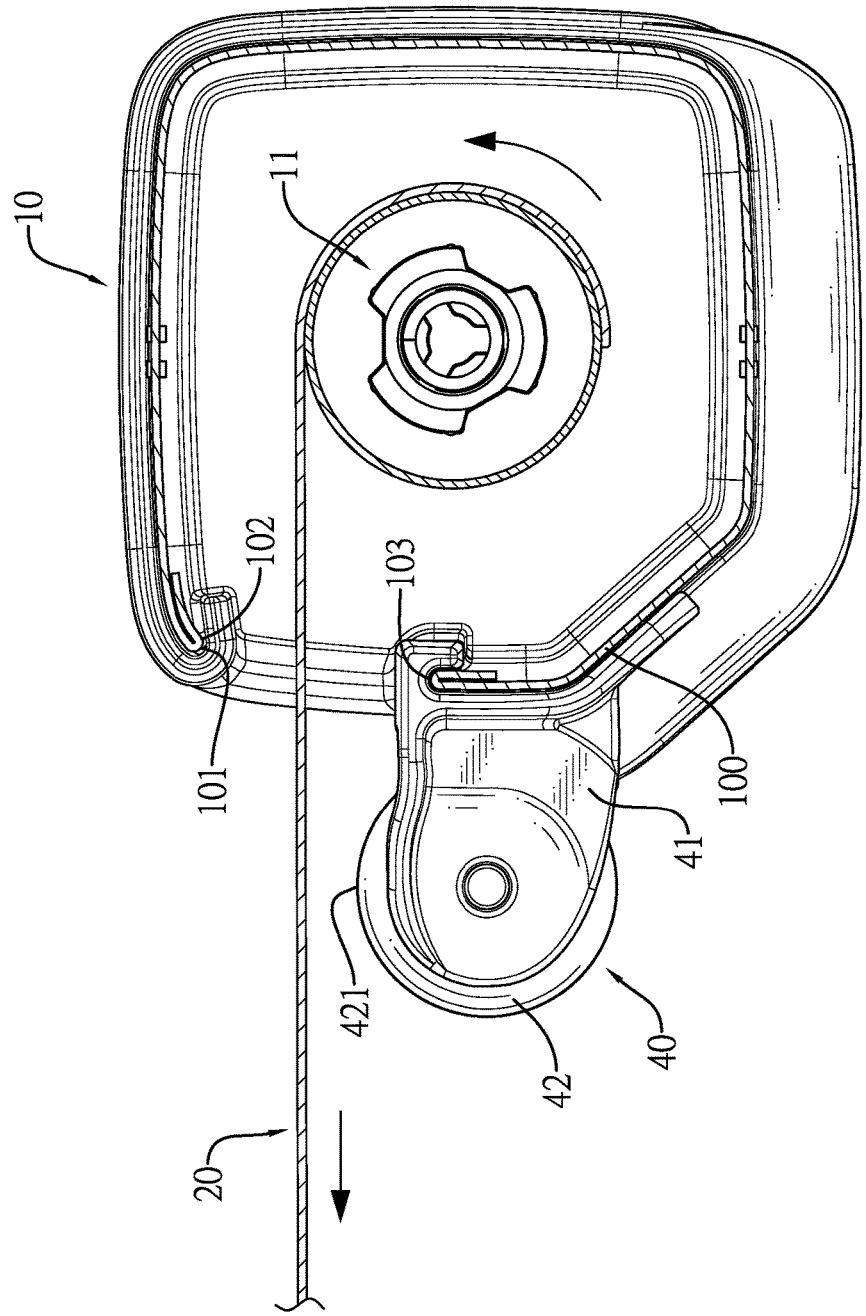
FIG. 13 is an enlarged end view in partial section of the vehicle curtain assembly in FIG. 11.

With reference to FIGS. 3 to 5, the auxiliary wheel mechanism is mounted on the side wall 100 of the axle tube 10 and comprises at least one wheel assembly 40. Each one of the at least one wheel assembly 40 comprises a wheel base 41 and at least one wheel 42. The wheel base 41 is mounted on the side wall 100 of the axle tube 10 at a position adjacent to the slot 101. The at least one wheel 42 is rotatably mounted on the wheel base 41 and is applied to abut a bottom of the curtain fabric 20, to rotate to push the curtain fabric 20 to move toward the slot 101, and to abut a bottom of the rim board 30 to position the rim board 30. With further reference to FIG. 13, each wheel 42 has a top edge 421 lower than a top edge 102 of the slot 101 in the axle tube 10. The top edge 421 of each wheel 42 may be higher or lower than a bottom edge 103 of the slot 101 or may be flush with the bottom edge 103 of the slot 101. Preferably, the top edge 421 of each wheel 42 is higher than the bottom edge 103 of the slot 101.

Figure 8:
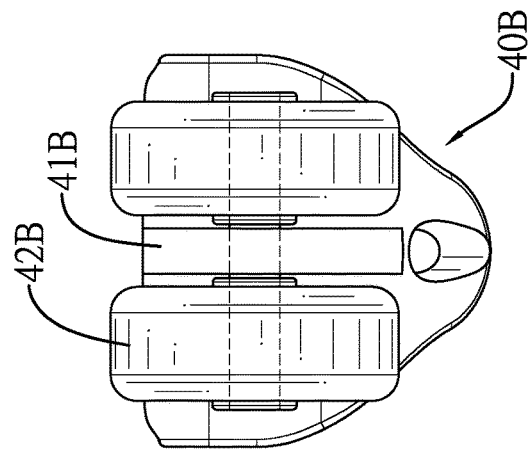
FIG. 8 is a perspective view of a third embodiment of a wheel assembly of a vehicle curtain assembly in accordance with the present invention.
Figure 7:
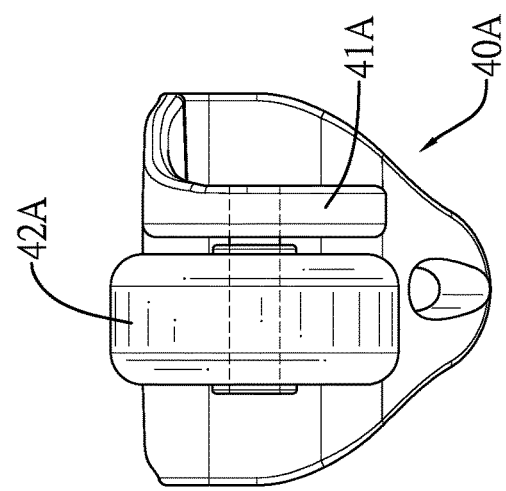
FIG. 7 is a perspective view of a second embodiment of a wheel assembly of a vehicle curtain assembly in accordance with the present invention.
Figure 6:
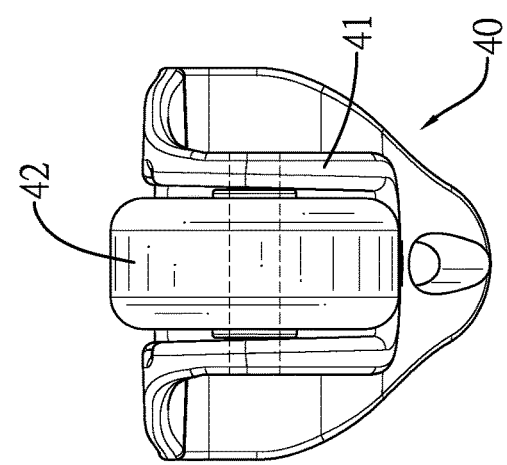
FIG. 6 is an enlarged perspective view of a first embodiment of a wheel assembly of the vehicle curtain assembly in FIG. 1.

With reference to FIGS. 3 and 6, in a first embodiment, one wheel 42 is implemented in each wheel assembly 40 and is mounted rotatably in the wheel base 41. With reference to FIG. 7, in a second embodiment, one wheel 42A is implemented in each wheel assembly 40A and is attached rotatably to a side of the wheel base 41A. With reference to FIG. 8, in a third embodiment, two wheels 42B are implemented in each wheel assembly 40B and are respectively attached rotatably to two sides of the wheel base 41B.

The wheel base 41 of each one of the at least one wheel assembly 40 is an individual element and is securely mounted on the side wall 100 of the axle tube 10 by glue, threaded fasteners, rivets, in an engaging manner or the like. With reference to FIGS. 3 and 5, in the first embodiment, the wheel base 41 comprises an abutting panel 411, a top hook 412, a through hole 413, and a fastener 414. The abutting panel 411 abuts the side wall 100 of the axle tube 10 and has a top end and a bottom end. The top hook 412 is formed on the top end of the abutting panel 411 and is hooked over the bottom edge 103 of the slot 101 in the axle tube 10. The through hole 413 is defined through the abutting panel 411 at a position adjacent to the bottom end of the abutting panel 411. The fastener may be a screw, is mounted through the through hole 413, and is securely connected with the side wall 100 of the axle tube 10. With the top hook 412 and the fastener, the wheel base 41 is securely connected with the side wall 100 of the axle tube 10.

Figure 9:
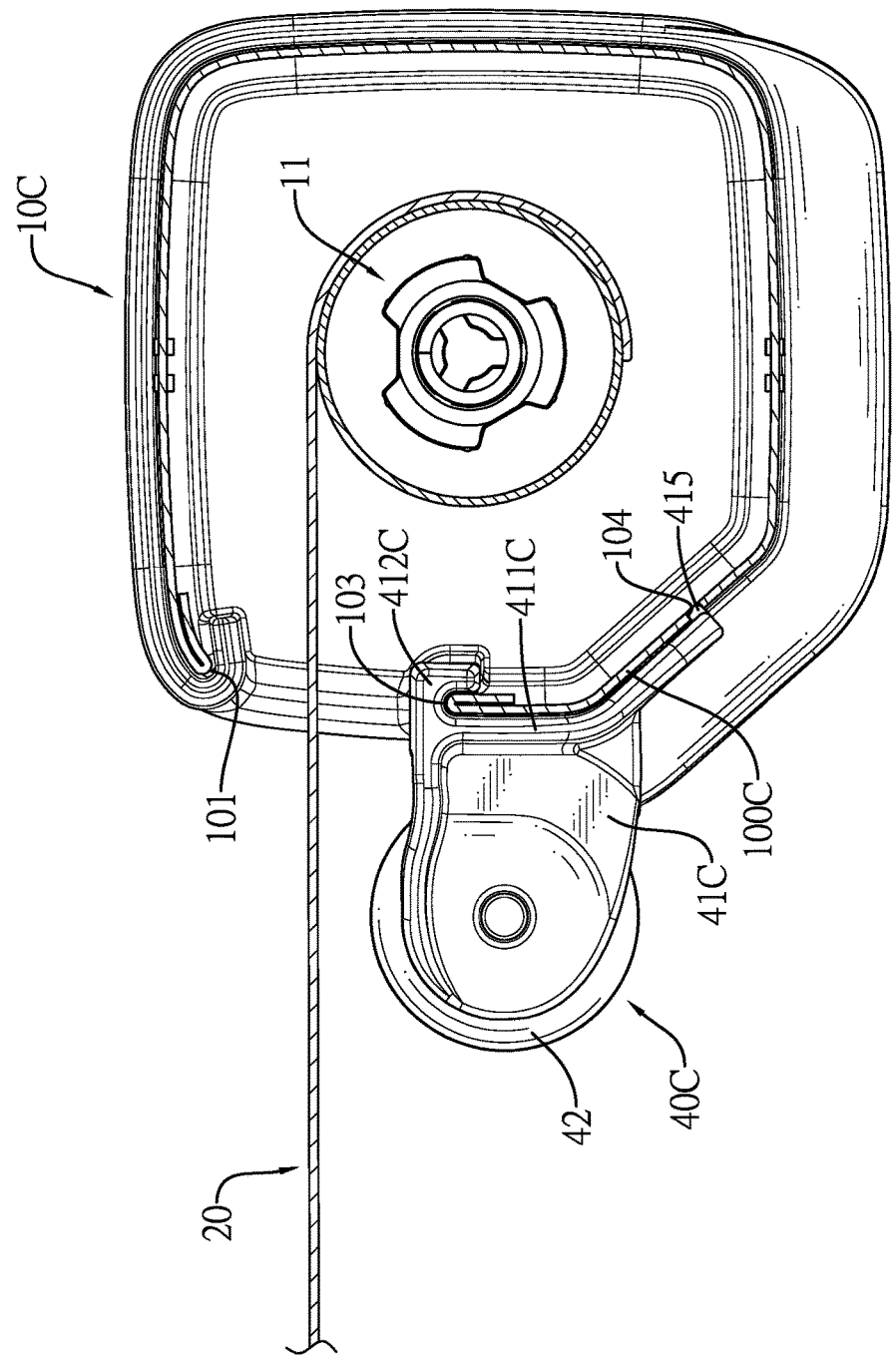
FIG. 9 is an end view in partial section of a second embodiment of a vehicle curtain assembly in accordance with the present invention.

With reference to FIG. 9, in the second embodiment, the axle tube 10C further has hook hole 104 defined in the side wall 100C. The wheel base 41C of each one of the at least one wheel assembly 40C comprises a bottom hook 415. The bottom hook 415 is formed on the bottom end of the abutting panel 411C and is hooked into the hook hole 104 in the side wall 100C of the axle tube 10C. With the top hook 412C and the bottom hook 415, the wheel base 41C is securely connected with the side wall 100C of the axle tube 10C.

Figure 10:
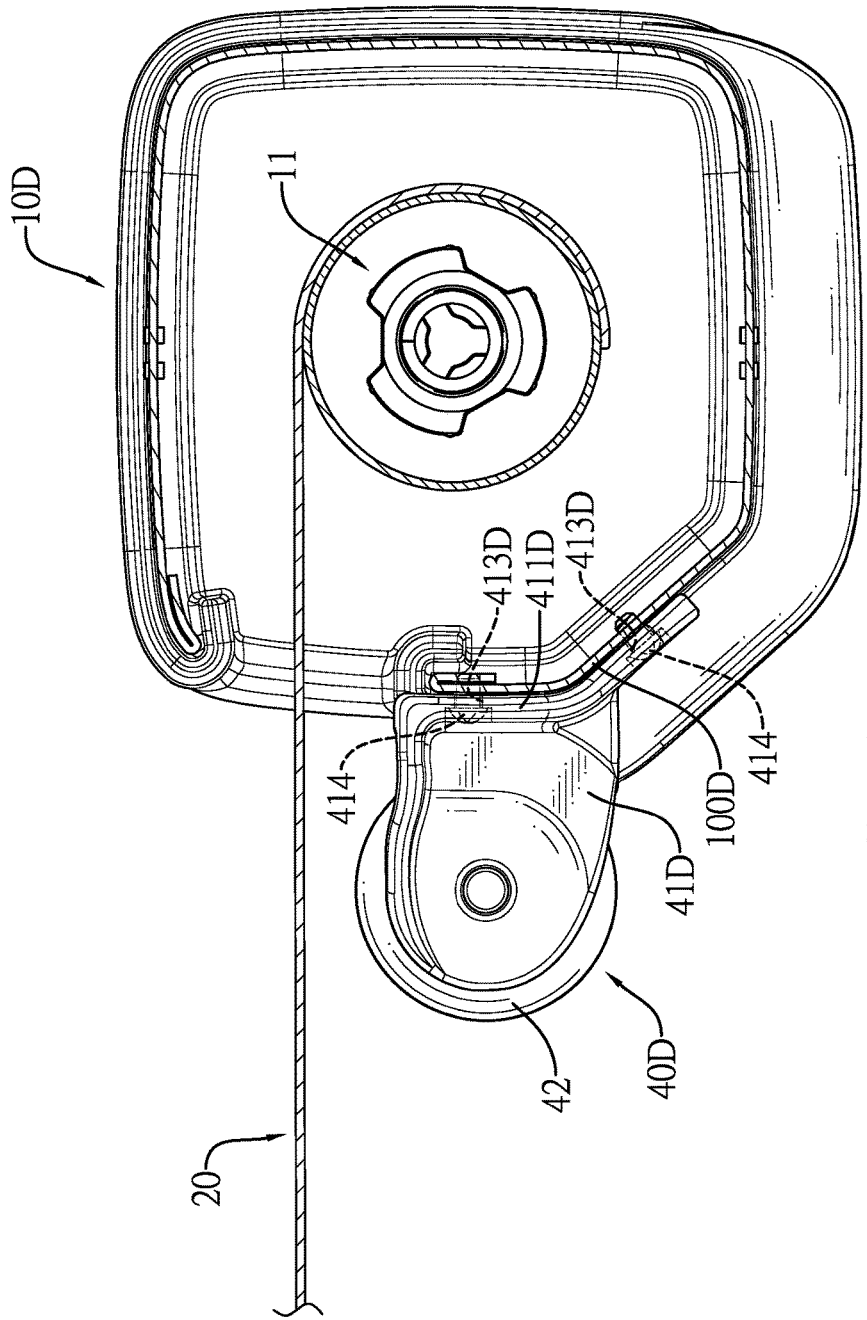
FIG. 10 is an end view in partial section of a third embodiment of a vehicle curtain assembly in accordance with the present invention.

With reference to FIG. 10, in the third embodiment, the abutting panel 411D has multiple through holes 413D defined through the abutting panel 411D and are preferably located at positions adjacent to the top end and the bottom end of the abutting panel 411D. Multiple fasteners 414 are mounted respectively through the through holes 413D and are connected securely with the side wall 100D of the axle tube 10D. With the fasteners 414, the wheel base 41D of each wheel assembly 40D is securely connected with the side wall 100D of the axle tube 10D.

Figure 11:
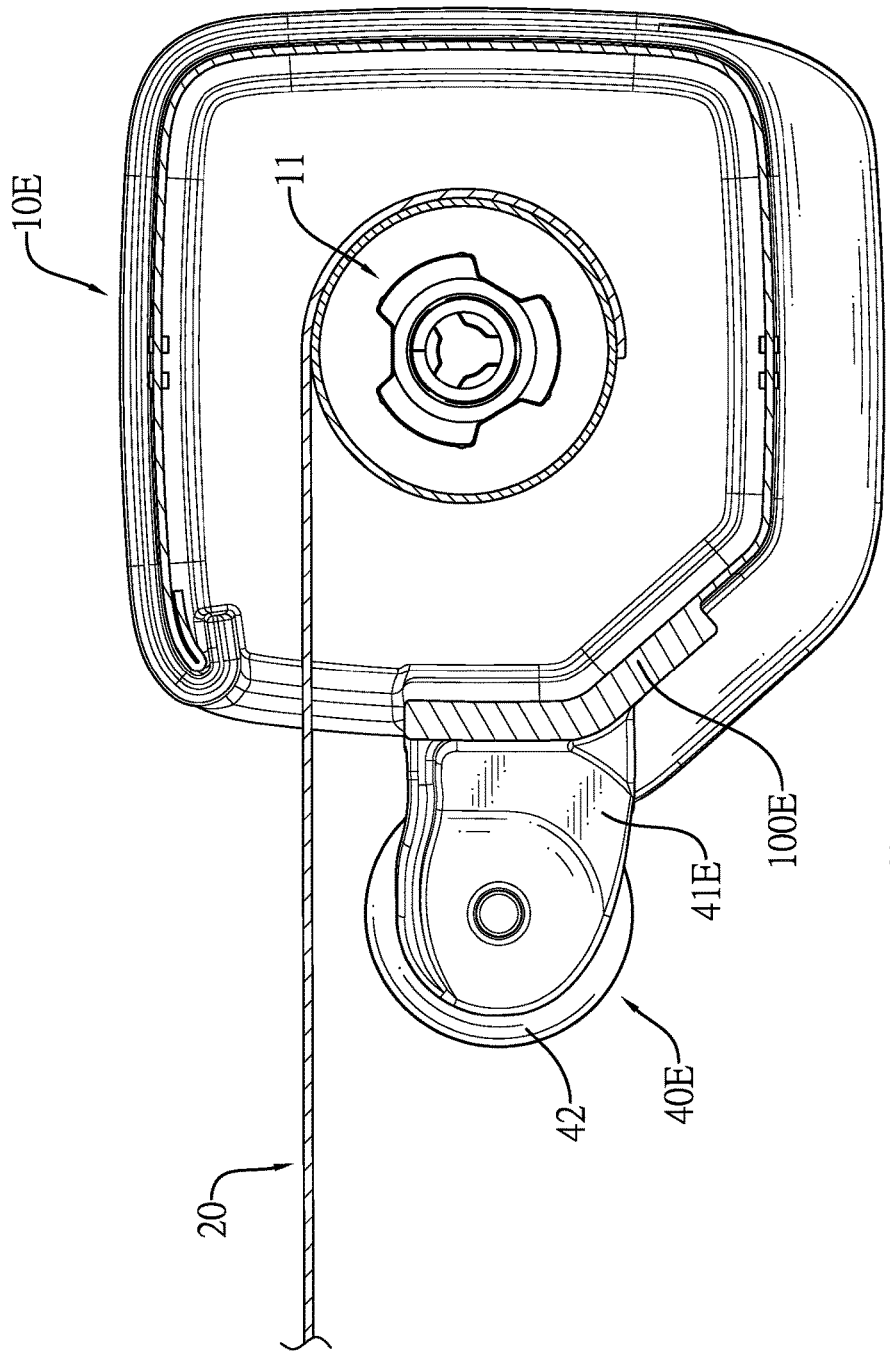
FIG. 11 is an end view in partial section of a fourth embodiment of a vehicle curtain assembly in accordance with the present invention.

With reference to FIG. 11, in the fourth embodiment, the wheel base 41E of each wheel assembly 40E is integrally formed on the side wall 100E of the axle tube 10E as a single part.

The amount of the wheel assembly 40 may be changed based on the actual demand of the vehicle curtain assembly. When only one wheel assembly 40 is implemented, the wheel assembly 40 is mounted on the side wall 100 at a position corresponding to a middle of the slot 101. With reference to FIG. 1, when two wheel assemblies 40 are implemented in amount, the two wheel assemblies 40 are mounted respectively on the side wall 100 at two positions respectively adjacent to two ends of the slot 101. When three or more than three wheel assemblies 40 are implemented, the wheel assemblies 40 are arranged along the slot 101 at even intervals.

Figure 12:
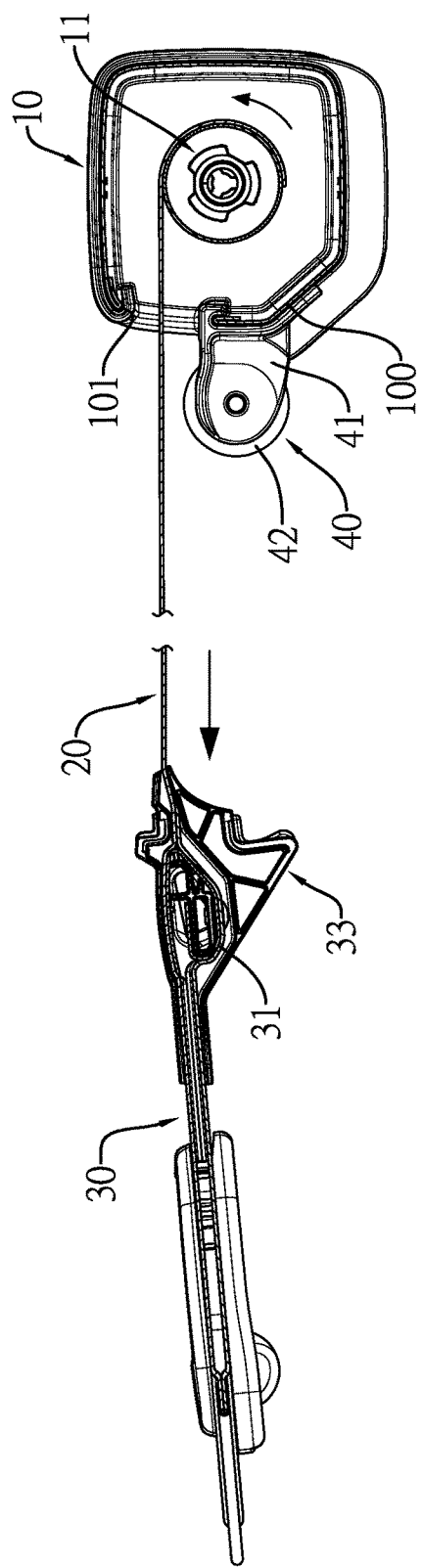
FIG. 12 is an operational end view in partial section of the vehicle curtain assembly in FIG. 1 showing that the curtain fabric is expanded.

With reference to FIGS. 1 and 2, the axle tube 10 is securely connected to and positioned at two sides of the trunk of a vehicle near the rear seat by the two tube positioning members 12. With reference to FIGS. 12 and 13, when the curtain fabric 20 is expanded from the axle tube 10 via the slot 101, the curtain fabric 20 will be held at the expanded position by the engagement between the fabric positioning elements 33 on the ends of the rim rod 31 and the sides of the trunk. The expanded curtain fabric 20 can provide a shading effect to the objects in the trunk.

Figure 14:
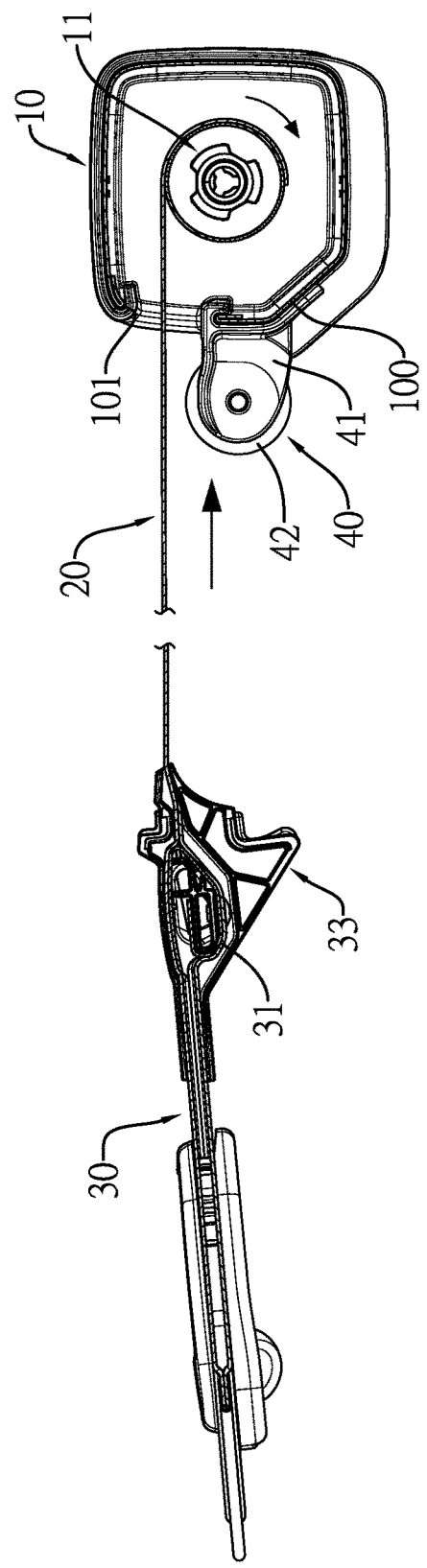
FIG. 14 is an operational end view in partial section of the vehicle curtain assembly in FIG. 1 showing that the curtain fabric is reeled into the axle tube.

With reference to FIG. 14, to reel the curtain fabric 20, the fabric positioning elements 33 are disengaged from the sides of the trunk, and the curtain fabric 20 can be automatically reeled into the axle tube 10 by the reeling device 11.

Figure 15:
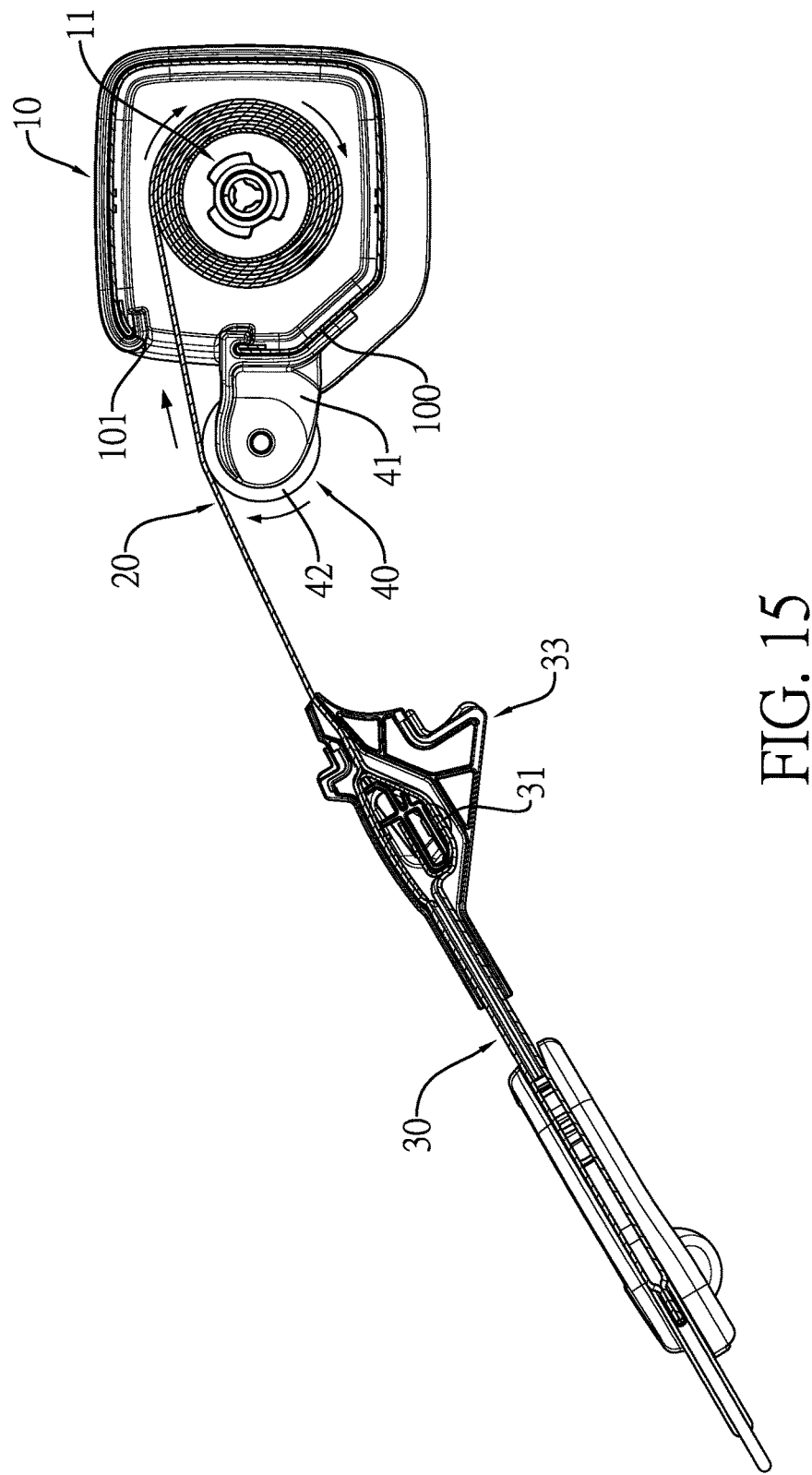
FIG. 15 is another operational end view in partial section of the vehicle curtain assembly in FIG. 1 showing that the curtain fabric is reeled into the axle tube.

With reference to FIG. 15, while the curtain fabric 20 is reeled into the axle tube 10, the rim board 30 is released by the user and the rim board 30 will droop due to the weight of the rim board 30. At this time, the wheels 42 of the wheel assemblies 40 can abut the bottom of the curtain fabric 20, and the wheels 42 are rotated by the reeled curtain fabric 20. The rotation of the wheels 42 can provide an assisting effect to push the curtain fabric 20 to be reeled into the axle tube 10.

Figure 16:
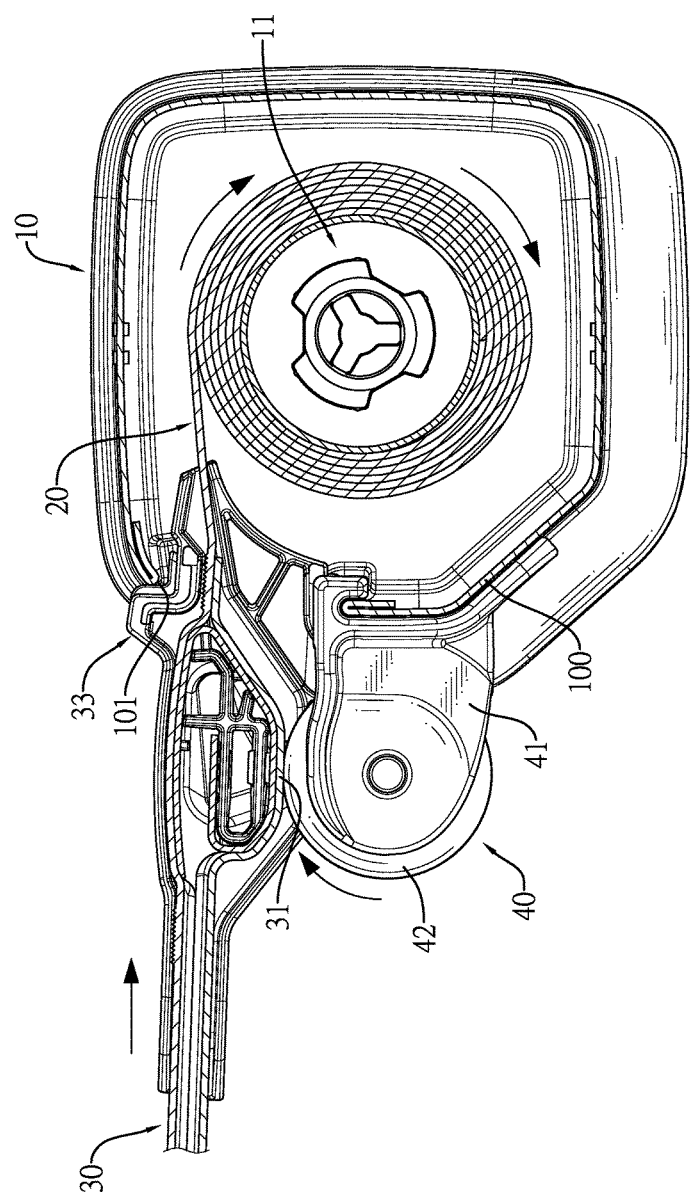
FIG. 16 is an enlarged operational end view in partial section of the vehicle curtain assembly in FIG. 1 showing that the curtain fabric is completely reeled into the axle tube.

With reference to FIG. 16, when the rim board 30 approaches the slot 101 in the axle tube 10, the rotating wheels 42 will push the rim board 30 to allow the fabric positioning elements 33 on the rim rod 31 to engage with the slot 101. At this time, the wheels 42 abut the bottom of the rim board 30 to position the rim board 30. Accordingly, the rim board 30 will be kept from drooping by the support of the wheels 42, and the curtain fabric 20 is completely reeled into and held inside the axle tube 10 with the engagement of the fabric positioning elements 33 with the slot 101. Therefore, the rim board 30 can be prevented from bumping the objects in the trunk during the movement of the vehicle.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A vehicle curtain assembly comprising:
   an axle tube having two ends, a side wall, and a slot defined in the sidewall;
   a reeling device mounted in the axle tube;
   two tube positioning members mounted respectively on the two ends of the axle tube;
   a curtain fabric extending into the axle tube via the slot and connected to and reeled around the reeling device;
   a rim board connected to an end of the curtain fabric that extends out of the slot of the axle tube and comprising a rim rod having two ends and two fabric positioning elements mounted respectively on the two ends of the rim rod;
   an auxiliary wheel mechanism mounted on the side wall of the axle tube and comprising at least one wheel assembly, and each one of the at least one wheel assembly comprising
   a wheel base mounted on the side wall of the axle tube; and
   at least one wheel rotatably mounted on the wheel base and applied to abut a bottom of the curtain fabric, to rotate to push the curtain fabric to move toward the slot, and to abut a bottom of the rim board to position the rim board, wherein
   the wheel base of each one of the at least one wheel assembly is an individual element and is securely mounted on the side wall of the axle tube; and
   the wheel base of each one of the at least one wheel assembly comprises
   an abutting panel abutting the side wall of the axle tube and having a top end and a bottom end; and
   a top hook formed on the top end of the abutting panel and hooked over a bottom edge of the slot in the axle tube.

2. The vehicle curtain assembly as claimed in claim 1, wherein the abutting panel of the wheel base of each one of the at least one wheel assembly further comprises
   a through hole defined through the abutting panel at a position adjacent to the bottom end of the abutting panel; and
   a fastener mounted through the through hole and securely connected with the side wall of the axle tube.

3. The vehicle curtain assembly as claimed in claim 1, wherein the axle tube further has a hook hole defined in the side wall; and
   the wheel base of each one of the at least one wheel assembly comprises
   a bottom hook formed on the bottom end of the abutting panel and hooked into the hook hole in the side wall of the axle tube.

4. A vehicle curtain assembly comprising:
   an axle tube having two ends, a side wall, and a slot defined in the sidewall;
   a reeling device mounted in the axle tube;
   two tube positioning members mounted respectively on the two ends of the axle tube;
   a curtain fabric extending into the axle tube via the slot and connected to and reeled around the reeling device;
   a rim board connected to an end of the curtain fabric that extends out of the slot of the axle tube and comprising a rim rod having two ends and two fabric positioning elements mounted respectively on the two ends of the rim rod;
   an auxiliary wheel mechanism mounted on the side wall of the axle tube and comprising at least one wheel assembly, and each one of the at least one wheel assembly comprising
   a wheel base mounted on the side wall of the axle tube; and
   at least one wheel rotatably mounted on the wheel base and applied to abut a bottom of the curtain fabric, to rotate to push the curtain fabric to move toward the slot, and to abut a bottom of the rim board to position the rim board, wherein
   the wheel base of each one of the at least one wheel assembly is an individual element and is securely mounted on the side wall of the axle tube; and
   the wheel base of each one of the at least one wheel assembly comprises
   an abutting panel abutting the side wall of the axle tube and having a top end and a bottom end;
   multiple through holes defined through the abutting panel; and
   multiple fasteners mounted respectively through the through holes and connected securely with the side wall of the axle tube.

5. The vehicle curtain assembly as claimed in claim 4, wherein each one of the at least one wheel of each one of the at least one wheel assembly has a top edge lower than a top edge of the slot in the axle tube and higher than a bottom edge of the slot.

6. The vehicle curtain assembly as claimed in claim 5, wherein two wheel assemblies are implemented in amount; and
   the two wheel assemblies are mounted respectively on the side wall at two positions respectively adjacent to two ends of the slot.

7. The vehicle curtain assembly as claimed in claim 1, wherein each one of the at least one wheel of each one of the at least one wheel assembly has a top edge lower than a top edge of the slot in the axle tube and higher than the bottom edge of the slot.

8. The vehicle curtain assembly as claimed in claim 7, wherein two wheel assemblies are implemented in amount; and
   the two wheel assemblies are mounted respectively on the side wall at two positions respectively adjacent to two ends of the slot.

9. The vehicle curtain assembly as claimed in claim 4, wherein two wheel assemblies are implemented in amount; and
   the two wheel assemblies are mounted respectively on the side wall at two positions respectively adjacent to two ends of the slot.

* * * * *